Aug. 10, 1965   W. H. THRELKELD   3,199,380

VALVE STEM DRILL JIG

Filed March 21, 1963

INVENTOR.
W. H. THRELKELD
BY
ATTORNEY 3,199,380
VALVE STEM DRILL JIG
William H. Threlkeld, 1028 Azalea Court,
La Marque, Tex.
Filed Mar. 21, 1963, Ser. No. 267,036
3 Claims. (Cl. 77—62)

This invention relates to a drill jig for removing valve stem screws. More particularly, it relates to a device for holding a valve stem and for guiding a drill to remove a damaged screw in either end of the valve stem.

A very large expense in household and commercial plumbing maintenance is the replacement of valve stems when the head or tail screw holding the valve handle or washer is defective or sheared away. It is usual for the entire valve to be replaced or at least it is necessary to replace the valve stem. Many devices and methods for repairing these valve stems have been proposed but they are either too expensive, too time consuming, or are apt to damage the valve stem during the operation. One such apparatus which is the subject of U.S. Patent 3,030,-830 to Charles H. Reyner is a rather complicated tool for shop use wherein the valve stem is clamped in a holder and a drill is guided through an adjustable hole some distance away to drill out the valve stem.

It has now been discovered that a simple hand device which is fool-proof to use can be employed to drill out the damaged handle or washer screw in an ordinary valve stem and the valve stem can thereafter be returned to use immediately.

The principal object, therefore, of the present invention is to provide an improved valve stem holder and drill guide device for repairing valve stems. Another important object of this invention is to provide a valve stem holder and drill guide device which is simple in construction and operation and can be used in any location by an inexperienced workman. Still a further object of the invention is to provide a valve stem holder and drill guide device which is lightweight and inexpensive but nevertheless is absolutely accurate and exact when used to drill out valve stem screws. These and other objects of the invention will become apparent from the following description, claims and drawing.

According to this invention, an apparatus for clamping a drill stem and for thereafter drilling out the screw in said valve stem by the use of an exact drill guide located axially to the valve stem is provided in one piece of simple, hand-usable, easy-to-operate device.

Figure 1:
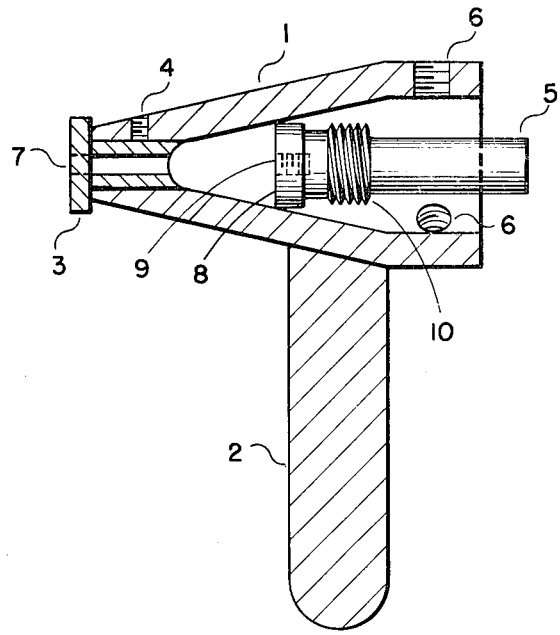
FIGURE 1 is a cut-away side view of the apparatus of this invention showing the internals of the apparatus with a valve stem inserted.

Referring now to FIGURE 1 wherein the cut-away side view shows a valve stem therein, the apparatus illustrated is comprised of the outside body 1, usually of steel or die cast, a handle 2 for easy operation of the apparatus, and the drill guide insert 3 which is replaceable and is generally of a harder material than the body of the apparatus. The drill guide insert 3 is held in place by a set screw 4 and has an opening 7 drilled out for the proper drill bit size, usually ⁹⁄₆₄ inch, but also for any size from about ⅛ inch to about ⅜ inch. The valve stem 5 shown in place in the apparatus is held in the proper and exact position by hand screws (not shown) which enter through threaded holes 6. As can be easily seen from FIGURE 1, the apparatus of this invention is designed to allow the valve stem to self-center itself by the valve stem head 8 fitting snug against the inside of the apparatus body 1. With the valve stem end 8 self-centered in the apparatus, a drill bit of the proper size can be inserted through the opening 7 in the drill guide insert 3 and the valve stem screw 9 can be easily drilled out. The size of valve stem which may be employed with the apparatus of this invention is usually determined by the valve stem threads 10 and varies from about ½ inch nominal size to about 1 inch in diameter. Most of the drill stems requiring repair will usually be from about ½ inch to about 1 inch in diameter.

Figure 2:
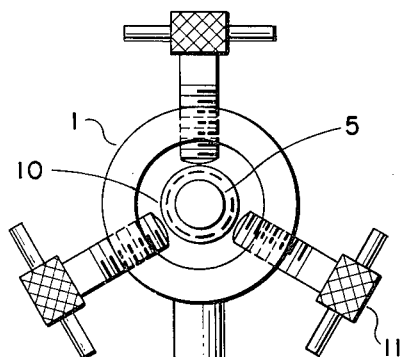
FIGURE 2 is an end view of the apparatus of this invention indicating precisely the clamping mechanism to hold the valve stem in the apparatus in an exacting position.

Referring to FIGURE 2, an end view of the apparatus is shown comprising the body 1, handle 2, and the hand screws 11 for holding the valve stem 5 in the proper and exact position for drilling of the valve stem screw. It is likewise essential that the hand screws 11 hold the valve stem tight against the body of the apparatus so that the self-centering effect of the apparatus will be effective.

It will be apparent to those skilled in the art that the present apparatus is a considerable improvement over the means used heretofore for repairing valve stems. For instance, the present apparatus is extremely simple in construction, having only the hand screws for holding the valve stem as movable parts. Consequently, the apparatus is not easily damaged and is quite inexpensive so that every plumber or pipefitter can well afford to have one available in his personal tools. In addition, the apparatus is extremely easy to operate since it is self-centering and since the depth of drilling is unimportant so that even the most inexperienced workman can easily operate this apparatus. Furthermore, the apparatus can be used on the job by holding in the hands and does not require any shop facilities.

The apparatus of this invention can be constructed of any metal or alloy of sufficient strength to withstand the stresses involved. Examples of a satisfactory material of construction are carbon steel, cast iron, stainless steel, aluminum, die cast aluminum, bronze, brass, magnesium, and the like.

What is claimed is:
1. An apparatus for use in holding a valve stem and guiding a drill bit into said valve stem to drill out a screw located axially in said valve stem, comprising a part cylindrical and part conical housing, a handle attached to the outside wall and perpendicular to said housing, a drill guide bushing inserted into the smaller diameter end of said housing and having a drill guide hole axially, in said bushing, a means for holding said bushing in a firm position in said housing, and holding means at the larger diameter end of said housing attached and perpendicular to said housing to hold said valve stem in a firm and centered position in said housing.
2. The apparatus of claim 1 wherein the number of holding means for holding said valve stem is at least 3.
3. The apparatus of claim 1 wherein the means for holding said drill guide bushing in a firm position in said housing comprises a shoulder on said bushing of greater diameter than said bushing and located at the outer end of said bushing outside said apparatus housing but adjacent to said housing.

References Cited by the Examiner

UNITED STATES PATENTS

| | | | |
|---|---|---|---|
| 833,917 | 10/06 | Burchardi | 77—63 |
| 1,056,100 | 3/13 | Hill | 269—156 |
| 2,209,021 | 7/40 | Hawker | 90—12.5 |
| 2,719,461 | 10/55 | Hawker | 17—13 X |

WILLIAM W. DYER, Jr., *Primary Examiner.*

J. SPENCER OVERHOLSER, FRANCIS S. HUSAR,
*Examiners.*